United States Patent [19]

Koerner et al.

[11] 4,380,503
[45] Apr. 19, 1983

[54] PROCESS FOR PREPARING OIL-IN-WATER EMULSION

[75] Inventors: Götz Koerner, Essen; Gerd Sänger, Heiligenhaus-Isenbügel; Hans-Ferdi Fink; Friedhelm Grassmann, both of Essen, all of Fed. Rep. of Germany

[73] Assignee: Th. Goldschmidt AG, Fed. Rep. of Germany

[21] Appl. No.: 269,844

[22] Filed: Jun. 3, 1981

[30] Foreign Application Priority Data

Jul. 1, 1980 [DE] Fed. Rep. of Germany ....... 3024870

[51] Int. Cl.$^3$ ............................................. B01J 13/00
[52] U.S. Cl. ..................................... 252/314; 252/312
[58] Field of Search ................................. 252/312, 314

[56] References Cited

U.S. PATENT DOCUMENTS

| | | | |
|---|---|---|---|
| 3,361,680 | 1/1968 | Bohrer | 252/314 |
| 3,635,834 | 1/1972 | Cilento et al. | 252/314 |
| 3,709,664 | 1/1973 | Krekeler et al. | 252/314 X |
| 4,000,086 | 12/1976 | Stoev et al. | 252/312 |
| 4,026,817 | 5/1977 | Ciuti et al. | 252/312 |

*Primary Examiner*—Lucille M. Phynes
*Attorney, Agent, or Firm*—James E. Bryan

[57] ABSTRACT

The invention relates to a process for the preparation of fine-particulate, stable emulsions of the oil-in-water type, in which the quantity of emulsifier required to achieve a stable emulsion is distributed in about 0.5 to 3 times the amount of water by weight, based upon the weight of the emulsifier, the emulsifying amount of the oleic phase is introduced into the foregoing dispersion, homogenization is performed under the effect of high shear stresses until a uniform gel is obtained, the gel so obtained is forced through a slotted disk comprising a plurality of holes less than 10 mm in diameter and into the residual amount of water, and the emulsion so generated is stirred while avoiding high shear stresses until the gel particles are completely dissolved. The process makes it possible to obtain fine-particulate, storage-stable and dilutable oil-in-water emulsions using only very small quantities of emulsifier.

3 Claims, No Drawings

PROCESS FOR PREPARING OIL-IN-WATER EMULSION

The invention relates to a process for preparing fine-particulate stable oil-in-water type emulsions. When preparing oil-in-water type emulsions, it is conventional practice to disperse an emulsifier in the oleic phase and to slowly stir the water into this dispersion. In the process and as a rule, first a mostly viscous water-in-oil type emulsion is formed, which upon further addition of water inverts into an oil-in-water emulsion.

If, for instance, the emulsifier or the oleic phase is in the form of substances that are pasty to solid at room temperature, then preferably the emulsifiers and/or the oil phase should be heated until a low viscosity is obtained. In such cases, the water required to form the emulsion also is added hot to the proposed emulsifier dispersion or to the oleic phase. The emulsion so generated or so obtained may be fed to a homogenizing or emulsifying apparatus to enhance the formation of uniform, finely dispersed emulsions. It is frequently observed however that when using vigorous stirring equipment, the opposite effect, namely a particle enlargement, may occur.

Frequently, difficulties are encountered, however, in preparing finely dispersed, storage stable oil-in-water emulsions if the quantity of the emulsifier or the emulsifier mixture is reduced, or if oleic phases difficult to emulsify are used. Representative examples of hard to emulsify oleic phases are organosilicon compounds. Frequently substantial quantities of emulsifier are needed to that end in order to obtain fine-particulate, simultaneously stable, and dilutable emulsions. As the emulsifier however enriches at least in part in the oleic phase, the properties of the oleic phase are thereby affected. Silicone oil emulsions are frequently used for hydrophobic purposes. This applicability is hampered by high emulsifier proportions. Also, certain waxes such as acid waxes, ester waxes, and paraffin waxes, which are used for hydrophobic purposes or as lubricants and mold release agents as a rule must be emulsified by small quantities of emulsifier. In these cases also the preparation of fine-particulate, stable, water-dilutable emulsions frequently presents difficulties.

It is therefore the object of this invention to provide an emulsifying process for forming oil-in-water type emulsions using as small as possible a quantity of emulsifier, where these emulsions are fine-particulate and storage-stable, and retain these properties after dilution.

This is surprisingly possible in that:

(a) the quantity of emulsifier required to obtain a stable emulsion is distributed in 0.5 to 3 times the quantity of water, based upon the emulsifier weight, (b) the quantity of the oleic phase to be emulsified is introduced into the foregoing dispersion and the mixture is homogenized under the influence of high shear stresses until a uniform gel is formed, (c) the gel so obtained is forced through a slotted disk, containing a plurality of holes with diameters less than 10 mm, into the remaining amount of water, the emulsion so generated being stirred, while avoiding high shear stresses, until complete dissolution.

The amount of emulsifier required for a stable emulsion is obtained by preliminary tests and is first dispersed in a small quantity of water in process step (a). It was found that based upon one unit of weight of emulsifier, from 0.5 to 3 times the quantity of water should be used. Preferably, from the same quantity to twice the quantity of water is used. Approximately equal quantities of emulsifier and water are especially preferred. If the emulsifier, or the mixture of emulsifiers, used is solid or pasty at room temperature, preferably this emulsifier is heated for better dispersion, or the quantity of water required for the dispersion is heated. Because as a rule the procedure is carried out in the absence of gauge pressure, the upper temperature limit is determined by the boiling point of the aqueous preparation. A temperature range of about 40° to 80° C. is preferred.

The total amount of the oleic phase to be emulsified is stirred, possibly at an elevated temperature, into the preparation so obtained in the course of process step (b). At the same time or thereupon, high shearing stresses are applied to the dispersion, whereby a gel is formed which in most instances is from clearly transparent to colloidally clouded and, in general, evinces thixotropic properties.

A typical device to achieve high shear stresses is an emulsifying machine where the substance to be homogenized is introduced between a rotor and a stator. The peripheral speed of the rotor should be about 15 to 45 m/s. The distance between the rotor and the stator should be about 0.05 to 2 mm.

In another device for achieving high shear stresses, the substance to be emulsified is forced at high pressure through a narrow slot. The operational pressure is between 150 and 500 bars. The width of the slot depends on the applied pressure and the viscosity of the supplied material.

A roll mill also may be used to apply high shear stresses to the material to be homogenized.

Other suitable devices are toothed attrition mills. The peripheral speed should be 10 to 30 m/s. The high shear stresses are due to thehigh viscosity of the substance to be homogenized.

The uniform, thixotropic gel obtained in process step (b) however is difficult to dissolve in the remaining water required to form the desired emulsion. If the gel is forced to disperse in water by stirring means, irregular oil-in-water emulsions will be obtained most of the time and which contain a substantial proportion of agglomerated particles which form a cream and therefore are not storage-stable.

It is therefore an essential feature of the process of the invention that the viscous gel obtained in process step (c) be forced by means of a pump through a slotted disk into the remaining amount of water, where the disk comprises a plurality of holes less than 10 mm in diameter. As the thixotropic gel is pressed through the holes, it presumably liquefies temporarily, whereby the strands of gel extruded from the slotted disk can distribute themselves into drop-shaped structures in the remaining water. Preferably, the holes of the slotted disk are 1 to 3 mm diameter. The water required to form the desired emulsion and into which the gel is forced through the slotted disk, in contrast with process step (b) is stirred while avoiding high shear stresses. The stirring action is merely for the purpose of an improved dispersion of the gel particles in the water, as these particles dissolve substantially better in the aqueous phase on account of their enlarged surface.

The process of the invention will be discussed in further detail in relation to the following examples.

CONTROL EXAMPLE 1

(not part of the invention)

350 kg of silicone oil of a viscosity of 350 mPas at 25° C., 25 kg of nonylphenolopolyglycol ether with a polyglycol chain containing 14 ethylene oxide groups, and 25 kg of nonylphenolpolyglycol ether with a polyglycol chain containing 3 ethylene oxide groups, are placed in an agitation vessel with a net capacity of 1,000 liters. This mixture is thoroughly mixed using a toothed attrition mill at a peripheral speed of 21 m/s and for 15 minutes. The ratio of the diameter of the toothed attrition mill to the diameter of the vessel is 0.33. Then the 600 kg of water required for emulsification are added at a rate of 10 l/min under the stirring conditions cited above. First, a highly viscous emulsion of the water-in-oil type is obtained, which, after about 400 liters of water have been added, turns into a low-viscosity oil-in-water emulsion. After the entire quantity of water has been added, the emulsion is stirred to completion for another 10 minutes. After shutting off the agitator, the emulsion is finally homogenized by being passed once through a high pressure homogenizer (Manton Gaulin M3) at a pressure of 350 kg/cm$^2$. The finished emulsion contains about 35% by weight of silicone oil.

CONTROL EXAMPLE 2

(Not part of the invention)

38.6 kg of nonylphenolpolyglycol ether with a polyglycol chain containing 14 ethylene oxide groups, and 38.6 kg of nonylphenol polyglycol ether with a polyglycol chain containing 3 ethylene oxide groups, are dissolved in 77.2 kg of water in an agitation vessel of 1,000 liter net capacity. The dissolution of the emulsifiers is supported by the agitation of a toothed attrition mill dipping into the mixture and positioned away from the bottom by about 1/5 of its diameter. After the emulsifiers have been homogeneously dispersed in the water, silicone oil with a viscosity of 350 mPas at 25° C. is added in a quantity of 540 kg over a period of about 35 minutes. Stirring is effected by the toothed attrition mill during the addition of the silicone oil; the ratio of agitator disk diameter to vessel diameter is 0.33. The peripheral speed is 21 m/s. An extremely viscous, transparent gel is obtained. After all of the silicone oil has been worked in, post-stirring is effected for 10 minutes. The gel contains 77.7% by weight of silicone oil and 11.11% by weight of emulsifier. This gel then is diluted under the above-cited stirring conditions by the addition of 308 kg of water to a content of silicone oil and emulsifier of 61.5% by weight. The water at first is added at a rate of about 5 l/min and is then increased, after the viscosity of the material being agitated has become low enough that all of the vessel contents can be rolled over, whereby all of the water will be worked in after about 20 minutes. After the agitator is shut off, this concentrated emulsion is finally homogenized by being passed once through a high-pressure homogenizer at a pressure of 350 kg/cm$^2$. The emulsion discharged from the high pressure homogenizer flows into an agitation vessel with a net capacity of 1750 liters. This vessel is equipped with a three-stage blade-stirrer. The ratio of the diameter of the blade stirrer to the diameter of the vessel is 0.90. After the entire homogenized emulsion is in the dilution vessel, the blade-stirrer is actuated to a peripheral speed of 1.2 m/s. The water required to dilute the emulsion to a 35% by weight silicone content is now added in a quantity of 540.5 kg at a rate of about 30 l/min. When all the water has been added, final-stirring continues for 10 minutes.

EXAMPLE 3

(invention)

A transparent, highly viscous 77.7% by weight gel (based upon the silicone content) is prepared in the same manner as in Example 2. Thereupon, this gel is pumped by a circulation piston pump through a conduit with an inside diameter of 5 cm to which is mounted a slotted disk, over the cross-section of which 50 bores 2 mm in diameter are uniformly distributed, and into an agitation vessel with a net capacity of 1750 liters. The slotted disk is mounted to the conduit in such a manner that the gel strands so obtained are directly fed into the 848.5 kg of dilution water. At the same time the input materials are agitated by means of the stirrer described in Example 2, which stirs at a peripheral speed of 1.2 m/s. Once the total paste has been pumped in, in 15 minutes, post-agitation continues for 10 to 15 minutes. At the end of that time all the gel particles have dissolved and a finely dispersed emulsion is obtained.

EXAMPLE 4

(invention)

First a transparent, highly viscous gel is prepared in the manner described in Example 3. This gel is pumped through a slotted disk, which differs from that described in Example 3 in that it comprises 8 bores with a diameter of 5 mm uniformly distributed over its cross-section, into the agitation vessel described in Example 3, wherein it is dissolved under the same conditions.

EXAMPLE 5

(invention)

38.6 kg of nonylphenol polyglycol ether with 14 ethylene oxide groups, and 36.8 kg of nonylphenol polyglycol ether with 3 ethylene groups, are dissolved in 77.2 kg of water in an agitation vessel with a net capacity of 1,000 liters and provided with a slowly moving stirrer (stirrer-blade/vessel diameter=0.9). 540 kg of silicone oil with a viscosity of 350 mPas are added to this solution and the entire substance is stirred for 30 minutes at a stirrer peripheral speed of 1.2 m/s. A low-viscosity mixture is obtained, which is pumped by a circulating piston pump through a homogenizing machine operating on the rotor/stator principle for the purpose of preparing the extremely viscous gel described in the above Examples. The rotor of the homogenizing machine is 120 mm in diameter and rotates at 3000 rpm, corresponding to a peripheral speed of nearly 19 m/s. The effective gap between the rotor and the stator is about 2 mm. Because of the application of high shear stresses, the relatively low-viscosity pre-mixture turns into an extremely viscous, transparent gel. This gel is forced through a conduit with a 50 mm inside diameter and through the slotted disk described in Example 3 into a mixing vessel loaded with 848.5 kg of water and converted into a finely dispersed emulsion under the conditions also described in Example 3.

The emulsions prepared according to Examples 1 through 5 were:

(1) investigated microscopically by known methods for the diameters of the dispersed oil droplets, and, (2) to ascertain storage stability, the following short-term tests were carried out:

(a) emulsion storage at 40° C., and
(b) centrifuging the emulsions.

RE 2(a):

The determination of the thermal stability of the emulsions at 40° C. is carried out as follows:

Dry cylindrical jars are filled with the emulsion to be tested up to about 5 mm below the end of the standard ground cut, and then a stopper is put in place. The stopper is secured by a steel spring which is linked to the hooks mounted on the sides of the jars and tensioned over the stopper.

The vapor space above the emulsion is adjusted to be quite small in order to prevent evaporation at the surface as much as possible, which might result in a separation of the effective substance (coalescence nuclei).

Thereupon, the cylindrical jars are placed in a water bath at 40° C.

The samples are removed at regular time intervals from the bath and checked for visible changes, for instance oil separation, cream formation, or skimming. The time to the first occurrence of the first visible changes is noted. The samples may remain in the water bath until cream formation or phase separation occurs.

RE 2(b):

The emulsions are tested for stability against centrifuging as follows:

Dry centrifuging glasses are precisely filled to the 10 ml mark with the emulsion to be tested. The centrifuging glasses then are placed into tapered insets so no imbalance takes place during centrifuging. If necessary, balancing must be carried out. After the lid of the centrifuge is closed, the speed is slowly increased to 4,500 rpm. After the speed of 4500 rpm has been reached, centrifuging continues exactly for 30 minutes at that speed. Upon turning off the centrifuge, the samples are removed therefrom for a short while and checked for oil separation, cream formation or skimming, without disturbing the emulsion (for instance by shaking) in the process. The creamed and/or deposited amount is read off the scale and noted. Then centrifuging is resumed for another 30 minutes and the separation is noted. Centrifuging is continued for 60 minutes more, so that the separations for 30, 60 and 120 minutes can be ascertained. Any separated upper and lower phase is recorded as a weight percentage of the input amount of emulsion.

The test results are summarized in Table 1:

TABLE 1

| | Emulsion of Example | Mean particle diameter | Mean test at 40° C. | Centrifuging test 30 min | Centrifuging test 2 hours |
|---|---|---|---|---|---|
| CONTROL | 1 | 5-6 μm | 48 h | 5/0 | 15/5 |
| | 2 | about 2 μm | ca 110 h | 0/0 | 4/0 |
| INVENTION | 3 | <1 μm | >240 h | 0/0 | 0/0 |
| | 4 | <1 μm | >240 h | 0/0 | 0/0 |
| | 5 | <1 μm | >240 h | 0/0 | 0/0 |

CONTROL EXAMPLE 6

(not part of the invention)

46.3 kg of an ethoxylated fatty acid glyceride with an HLB value of 17.4, and 30.9 kg of an ethoxylated synthetic fatty alcohol with an HLB value of 11 are dissolved in 77.2 kg of water in an agitation vessel of a net capacity of 1,000 liters. The dissolution of the emulsifier is effected by stirring with a toothed attrition mill dipping into the mixture and separated from the bottom by about 1/5 its diameter. After the emulsifiers have been homogeneously distributed in the water, 540 kg of silicone oil with a viscosity at 25° C. of 100,000 mPas are poured in over a period of about 35 minutes. Stirring is effected during the silicone oil addition by means of the toothed attrition mill where the ratio of mill diameter to vessel diameter is 0.33. The peripheral speed is 21 m/s. A transparent gel of very high viscosity is obtained. When all of the silicone oil is worked in, stirring is continued for another 10 minutes. The gel contains 77.7% by weight of silicone oil and 11.11% by weight of emulsifier. The gel is diluted under the above-cited conditions by the addition of 308 kg of water to a content of silicone oil and emulsifier of 61.5% by weight. The addition of water first takes place at a rate of about 5 l/min, and, after the viscosity of the stirred material has dropped enough to roll over the entire contents of the vessel, is raised in such a manner that about 20 minutes later all the water has been worked in. After the stirrer is shut off, the concentrated emulsion is post-homongenized by being passed once through a high-pressure homogenizer at a pressure of 350 kg/cm$^2$. The emulsion discharged from the high-pressure homogenizer passes into an agitator vessel with a net capacity of 1,750 liters. This vessel is equipped with a three-stage blade-stirrer. The ratio of stirrer-blade to vessel-diameter is 0.90. When the entire homogenized emulsion is in the dilution vessel, the stirrer is actuated to a peripheral speed of 1.2 m/s. Thereupon, the quantity of water required to dilute the emulsion to a content of 35% by weight of silicone oil is added in the form of 540.5 kg, at a rate of about 30 l/min. Once all the water has been added, stirring continues for another 10 minutes.

EXAMPLE 7

(invention)

A transparent, highly viscous 77.7% by weight gel (based upon the silicone content) is prepared in the same manner as described in Example 6. This gel then is pumped by means of a circulating piston pump through a conduit with an inside diameter of 5 cm connected to a slotted disk, on the cross-section of which 50 bores with a diameter of 2 mm are evenly distributed, into an agitation vessel of 1750 liters net capacity. The slotted disk is so mounted to the conduit that the gel strands generated are fed directly into 848.5 kg of dilution water. At the same time the input materials are stirred by means of the stirrer described in Example 2 and rotating at a peripheral speed of 1.2 m/s. After the entire paste has been pumped in for about 15 minutes, stirring continues for about 10 to 15 minutes. After that time all the gel particles are dissolved and a fine-particulate emulsion is obtained.

EXAMPLE 8

(invention)

46.3 kg of an ethoxylated fatty acid glyceride with an HLB value of 17.4, and 30.9 kg of an ethoxylated synthetic fatty alcohol with an HLB value of 11, are dissolved in 77.2 kg of water in an agitation vessel with a net capacity of 1,000 liters and provided with a slowly moving stirrer (stirring-blade/vessel diameter=0.9). 540 kg of a silicone oil with a viscosity of 100,000 mPas are added to that solution and are stirred for 30 minutes at a peripheral speed of 1.2 m/s. A low-viscosity mixture is obtained, which is pumped through a homogenizing machine operating on the rotor-stator principle, by means of a circulating piston pump, for the purpose of preparing a very highly viscous gel as described in the above Examples. The rotor of this machine has a diameter of 120 mm and rotates at a speed of 3,000 rpm, corresponding to a peripheral speed of about 19 m/s. The effective gap between the rotor and the stator is about 2 mm. An extremely viscous, transparent gel is obtained from the relatively low-viscosity mixture because of the application of the high shearing speeds. This gel is forced through a conduit 50 mm in inside diameter and through the slotted disk described in Example 3 into a mixing vessel containing 848.5 kg of water and is converted into a fine-particulate emulsion under the conditions also described in Example 3.

TABLE 2

| Emulsion of Example | Mean particle diameter | Heat test at 40° C. | Centrifuge test 30 min | 2 hours |
|---|---|---|---|---|
| CONTROL | 6 | 3-5 μm | ~80 h | 1/4 | 3/4 |
| INVENTION | 7 | 2-3 μm | >140 h | 0/0 | 0/0 |
| | 8 | 2-3 μm | >160 h | 0/0 | 0/0 |

CONTROL EXAMPLE 9

(not part of the invention)

29.4 kg of an ethoxylated fatty acid glyceride with an HLB value of 17.4, and 42.6 kg of an ethoxylated fatty alcohol with an HLB value of 4.9, are dissolved in 180.0 kg of water in an agitation vessel with a net capacity of 1,000 liters. The emulsifier dissolution is effected by stirring with a toothed attrition mill dipping into the mixture and at a distance of 1/5 of its diameter from the bottom. The mixture is heated to 85° C. during the dissolution. After the emulsifiers are uniformly distributed in the water, 400.0 kg of a melt of a paraffin wax heated to 85° C. (melting point 52-54° C.) are added in a time interval of about 35 minutes. Stirring with the toothed attrition mill for which the ratio of the stirring blade to vessel diameter is 0.33, takes place during the paraffin addition. The peripheral speed is 16 m/s. The temperature of the material being stirred is kept at 85° C. the entire time. At this temperature a transparent, extremely viscous gel is obtained. After the entire paraffin melt has been added, stirring continues another 10 minutes. The gel contains 59.70% by weight paraffin and 13.43% by weight emulsifier. Thereupon this gel is diluted, under the conditions of stirring described above by adding 330.0 kg of hot water at 85° C., to a content of 49.0% by weight paraffin wax and emulsifier. Initially the water is added at a rate of 5 l/min and when the viscosity of the material being stirred has dropped until the entire vessel contents can be rolled over, the rate of water supply is increased in such a manner that all of the water will be worked in during 30 minutes. After the stirrer is shut off, the concentrated emulsion at about 85° C. is homogenized by being passed once through a high-pressure homogenizer at a pressure of 300 kg/cm² and then is placed into an agitation vessel containing 1000.0 kg of water at 85° C. and with a net capacity of 2,000 l. The vessel is provided with a stirrer of which the ratio of blade-to-vessel diameter is 0.90. The stirrer rotates at a pheripheral speed of 1.2 m/s. The temperature is kept constant at 85° C. When all of the homogenized, concentrated emulsion has been placed in the dilution vessel, stirring proceeds for another 10 minutes. Thereupon, the emulsion at 85° C. is allowed to flow through a water-cooled heat-exchanger and is cooled as rapidly as possible to a temperature of about 30° C.

EXAMPLE 10

(invention)

29.4 kg of an ethoxylated fatty acid glyceride with an HLB value of 17.4, and 42.6 kg of an ethoxylated fatty alcohol with an HLB value of 4.9, are dissolved in 180.0 kg of water in an agitation vessel with a net capacity of 1000 liters and provided with a slowly moving stirrer (stirrer-blade/vessel diameter=0.9). The dissolution is effected by the stirrer, which rotates at a peripheral speed of 1.2 m/s. In addition, the mixture is heated to 85° C. during the dissolution. After the emulsifiers are homogeneously distributed in the water, 400.0 kg of a melt of a paraffin wax (melting point 52-54° C.) heated to 85° C. are added over a period of about 10 minutes. Stirring proceeds unaltered during the addition of the wax melt. After a total stirring time of 30 minutes, the 85° C. mixture of medium viscosity so obtained is pumped by means of a piston circulation pump through a homogenizing machine preheated to 85° C. and operating on the rotor-stator principle. The machine rotor is 120 mm in diameter and rotates at 3,000 rpm, corresponding to a peripheral speed of about 19 m/s. The effective gap between the rotor and the stator is about 2 mm. A transparent, extremely viscous gel is obtained from the relatively low-viscosity previous mixture due to the effect of the high shear rates, containing 59.70% by weight of paraffin and 13.43% by weight of emulsifier. This gel then is forced through a conduit of 50 mm diameter heated to 85° C., and through the slotted disk described in Example 3 into an agitation vessel containing 1,330 kg of water at 85° C. The stirring conditions are the same as those described in Example 3. During the entire time the contents of the vessel are maintained at 85° C. The hot, fine-particulate emulsion prepared in this manner is then cooled to a temperature of about 30° C. by being passed through a water-cooled heat-exchanger.

TABLE 3

| | Emulsion of Example | Mean particle diameter | Heat Test at 40° C. | Centrifuge test 30 min | 2 hours |
|---|---|---|---|---|---|
| CONTROL | 9 | 3-4 μm | ~96 h | 2/0 | 4/2 |
| INVENTION | 10 | 1-2 μm | >220 h | 0/0 | 0/0 |

It will be obvious to those skilled in the art that many modifications may be made within the scope of the present invention without departing from the spirit thereof, and the invention includes all such modifications.

What we claim is:

1. A process for the preparation of fine-particulate, stable emulsions of the oil-in-water type, which comprises
    (a) distributing the quantity of emulsifier required to achieve a stable emulsion in about 0.5 to 3 times the amount of water by weight, based upon the emulsifier weight,
    (b) introducing the oleic phase to be emulsified into the foregoing dispersion and homogenizing it under the effect of high shear stresses until a uniform gel is formed, (c) forcing the gel so obtained through a slotted disk, provided with a plurality of holes less than 10 mm in diameter, into the remaining amount of water, and stirring the emulsion so obtained while avoiding high shear stresses until the gel particles are completely dissolved.

2. A process according to claim 1 including performing process steps (a) and (b) at elevated temperatures.

3. A process according to claim 1 or claim 2 including using a slotted disk in process step (c) of which the holes are 1 to 3 mm in diameter.

* * * * *